United States Patent [19]
Gingell

[11] Patent Number: 5,497,363
[45] Date of Patent: Mar. 5, 1996

[54] EXPANSION SHELF FOR ACCESS SYSTEM AND SWITCH BLOCK THEREFOR

[75] Inventor: Michael J. Gingell, Raleigh, N.C.

[73] Assignee: Alcatel Network Systems, Inc., Richardson, Tex.

[21] Appl. No.: 310,934

[22] Filed: Sep. 29, 1994

[51] Int. Cl.[6] .................................................. H04J 3/08
[52] U.S. Cl. .................................. 370/55; 370/56; 370/68
[58] Field of Search ................................ 370/68, 79, 84, 370/55, 112, 56

[56] References Cited

U.S. PATENT DOCUMENTS

| | | | |
|---|---|---|---|
| 5,014,268 | 5/1991 | Tyrrell et al. | 370/68 |
| 5,046,067 | 9/1991 | Kimbrough | 370/56 |
| 5,060,229 | 10/1991 | Tyrrell et al. | 370/112 |
| 5,161,152 | 11/1992 | Czerwiec et al. | 370/84 |
| 5,189,673 | 2/1993 | Burton et al. | 370/58.2 |
| 5,191,456 | 3/1993 | Sutherland et al. | 370/84 |
| 5,301,050 | 4/1994 | Czerwiec et al. | 370/13 |

*Primary Examiner*—Douglas W. Olms
*Assistant Examiner*—Min Jung
*Attorney, Agent, or Firm*—Ware, Fressola, Van Der Sluys & Adolphson

[57] ABSTRACT

A cross-connect for interfacing high-speed ports and having add/drop multiplexing capabilities for permitting simultaneous access to all individual subscribers may be improved by utilizing a switch block arrangement for allowing downstream subscribers to be switched among each other without the need to be switched upstream through the cross-connect or may alternatively be improved by substituting an expansion shelf in place of a line shelf so as to permit the addition of additional line shelves and hence, additional subscribers. This latter improvement is made possible by assuming that not all subscribers will need access to the cross-connect at the same time. A switch block for such arrangements can output either an input data signal previously stored in a switch memory or a daisy-chain input that is output from another switch block in the arrangement.

3 Claims, 12 Drawing Sheets

EXPANSION SHELF FOR ACCESS SYSTEM AND SWITCH BLOCK THEREFOR

TECHNICAL FIELD

This invention relates to telecommunications and, more particularly, to access systems.

BACKGROUND OF THE INVENTION

Present access systems comprise access products such as add/drop multiplexers and other similar network elements that are typically housed in a network element housing for deployment in a switching station. Many such switching stations are deployed over a wide geographical area and interconnected by means of wires, optical fibers or other means of communication. Such a network element housing may comprise a metallic structure having a number of plug-in racks each having a number of plug-in circuit boards within. For an add/drop multiplexer, at least one of the racks will typically include the core switch which interfaces, in industry parlance, to east and west high speed ports that are connected to high rate digital serial signals, for example, in the synchronous optical network format. For example, the add/drop multiplexer may interface to an OC-3 optical signal at its east and west ports, each OC-3 optical signal carrying 155.520 Mbit/s signals. This corresponds to three OC-1 (optical) signals at a 51.840 Mbit/s line rate, corresponding to three STS-1 (electrical) signals at the same rate. Each STS-1 frame consists of 90 columns and 9 rows of eight-bit bytes, for a total of 810 bytes (6480 bits). With a frame length of 125 microseconds (i.e., 8,000 frames per second), the STS-1 has a bit rate of 51.840 Mbit/s, as mentioned above. The order of transmission of bytes is row by row, from left to right, as shown in FIG. 7 of ANSI T1.105-1991, which is a well known industry standard defining the digital hierarchy, optical interface rates, formats and multiplexing schemes that result in a modular family of rates and formats available for use in optical interfaces generally referred to as the synchronous optical network. There are numerous other ANSI, CCITT, ISO/IEC and other standards listed in the above referenced document that define all aspects of the SONET.

In the SONET specifications, an add/drop multiplexer is a network element that provides access to all N, or some subset M (where M is a standard hierarchical level less than or equal to N), of the STS line signals contained within an OC-N optical channel. The STS signals are added to (inserted), and/or dropped from (extracted), the OC-N signal as it passes through the add-drop multiplexer. For example, an ADM-150 (also known as the 1603 SM) product of the assignee hereof is capable of interfacing OC-3 signals at its high speed ports and "dropping" three STS-1 signals to subscribers while providing simultaneous access to all subscribers. Thus, the ADM-150 is capable of multiplexing and demultiplexing all the digital level zero (DS0) channels in the three STS-1 signals to which it is intended to be connected. A housing for a network element such as an ADM-150 will typically include, as mentioned above, a rack or shelf containing the main switching fabric interfaced to the high speed ports to which are connected line shelves with further lower-level switching devices for demultiplexing and multiplexing at lower hierarchical levels. For an ADM-150, as mentioned, the OC-3 signal may be broken down to three STS-1 electrical signals each carrying up to 672 bytes or DS0 channels per frame. Each STS-1 signal is thus connected to one or more switches as it is demultiplexed down to the desired hierarchical level. For example, this could include, for each STS-1, up to seven shelves with 48 cards each arranged in twelve-card quadrants, each card being capable of transmitting two digital level zero (DS0) channels at 64 Kbit/sec each. This corresponds to 672 DS0s in the seven shelves associated with a particular STS-1 signal. For three STS-1 signals, there can be twenty-one such shelves for a total of up to 2,016 DS0 channels.

As mentioned, assignee's ADM-150 is capable of multiplexing and demultiplexing all the digital level zero (DS0) channels simultaneously. It will rarely be the case that such simultaneous access will be required by all 2,016 subscribers. Even though every single DS0 channel may be connected to individual subscribers, it will therefore most often be the case that the full capacity of the switching fabric of the ADM-150 or any similar switch will not be fully utilized. It may also be the case that a particular user may wish to expand the number of DS0 channels provided while at the same time not needing the full capacity of an ADM-150 switching fabric. It would be desirable for such a user to be able to add capacity without having to incur the extra cost of a completely new add/drop multiplexer.

DISCLOSURE OF INVENTION

An object of the present invention is to provide expandability of a network element.

According to the present invention, a cross-connect interfacing high-speed ports and having add/drop multiplexing capabilities permitting access to individual subscribers is improved by substituting an expansion shelf in place of a line shelf that permits the addition of additional line shelves and hence, additional subscribers. This is made possible by assuming that not all subscribers will need access to the cross-connect at the same time.

According further to the present invention, a network element is connected to an expansion shelf that is connected instead of a line shelf, wherein the expansion shelf is connected to the cross-connect in the same way as the line shelf would be, and is then connected to a plurality of line shelves similar to the line shelf it replaces. The expansion shelf has the capacity to receive signals from the cross-connect and route them to the appropriate line shelf and to receive add signals from a line shelf and either route them to the cross-connect or back down to another one of the line shelves to which it is connected.

The present invention takes advantage of the fact that most, if not all, of the time, not all of the subscribers will need access to the network and permits the conversion of a system that formerly provided access to all subscribers simultaneously to a system that sacrifices the ability to access all subscribers simultaneously while adding many more subscribers. This allows the cross-connect to be more efficiently used and permits a lesser number of cross-connects deployed in a given system.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
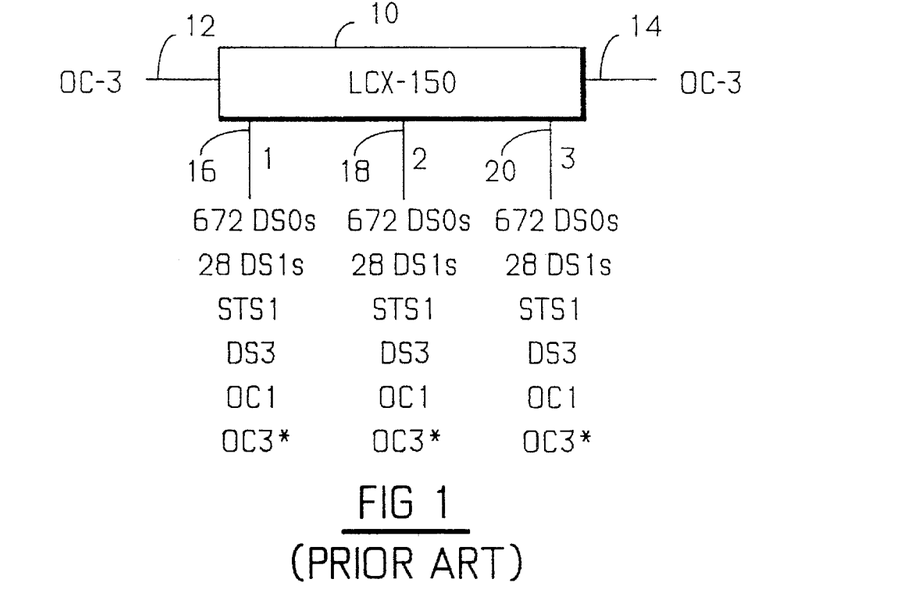
FIG. 1 shows a network element in the form of an add/drop multiplexer having OC-3 high-speed ports and having three STS-1 add/drop signals on the add/drop side of the multiplexer, according to the prior art.

FIG. 1 shows a network element 10 which is illustrated, for example, as being a SONET network element in the form of an add/drop multiplexer in the Assignee's access product line, i.e., an LCX-150 shown illustrated hooked up at its high-speed east and west ports to optical fibers 12, 14 carrying OC-3 level signals at the 155.520 Mbit/s line rate. On the low-speed, i.e., add/drop side of the multiplexer 10 are illustrated three separate drop signals 16, 18, 20 which may, for example, take any of the forms illustrated, including an electrical STS-1 signal at the 51.840 Mbit/s line rate.

Figure 2:
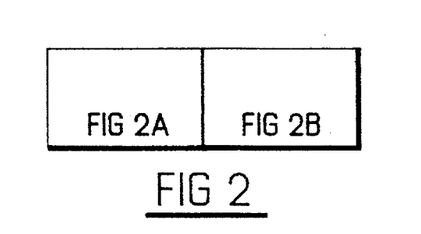
FIG. 2, 2A and 2B show a particular setup for an add/drop multiplexer along the lines suggested in FIG. 1, except improved according to the present invention.
Figure 2A:
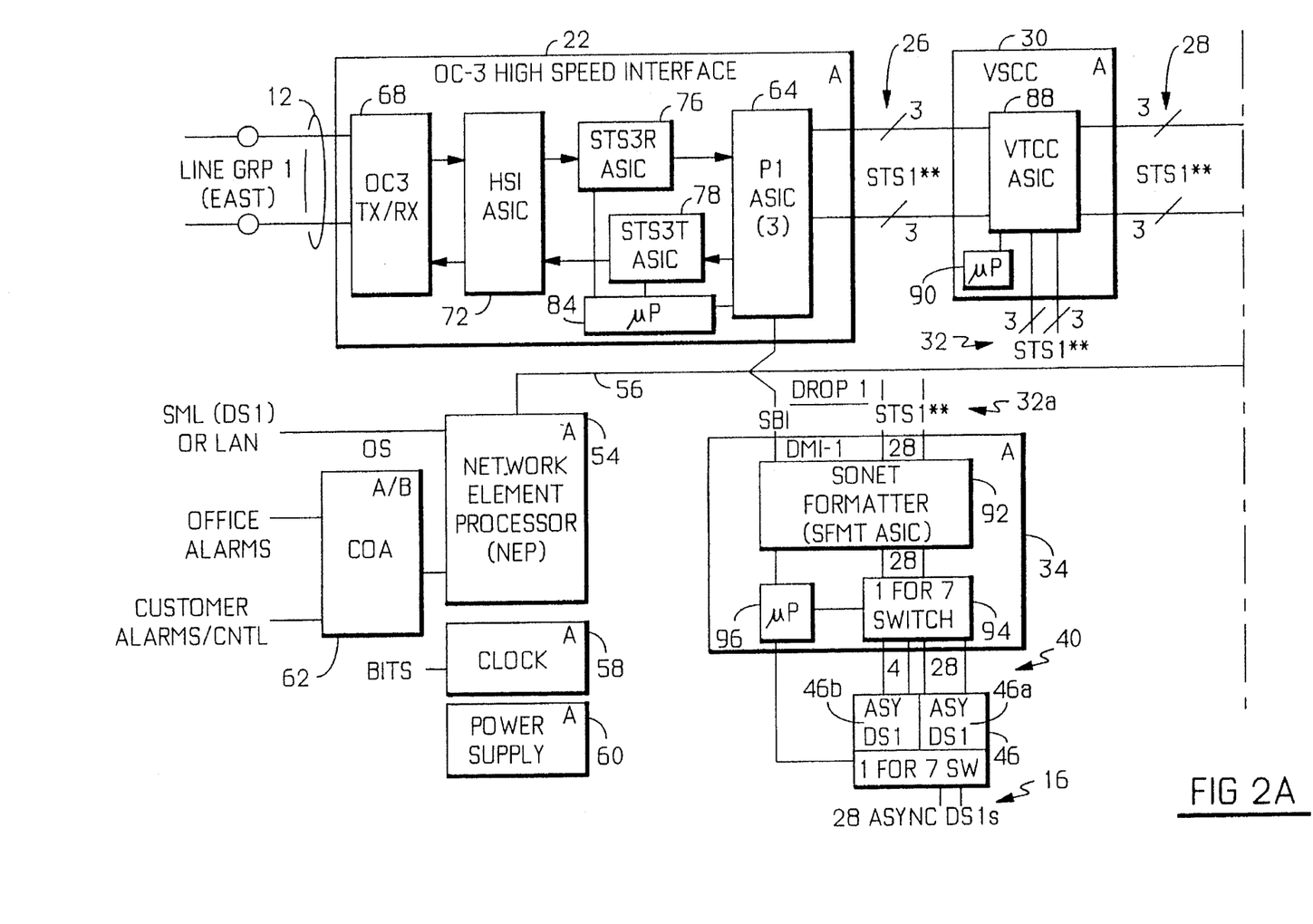
Figure 2B:
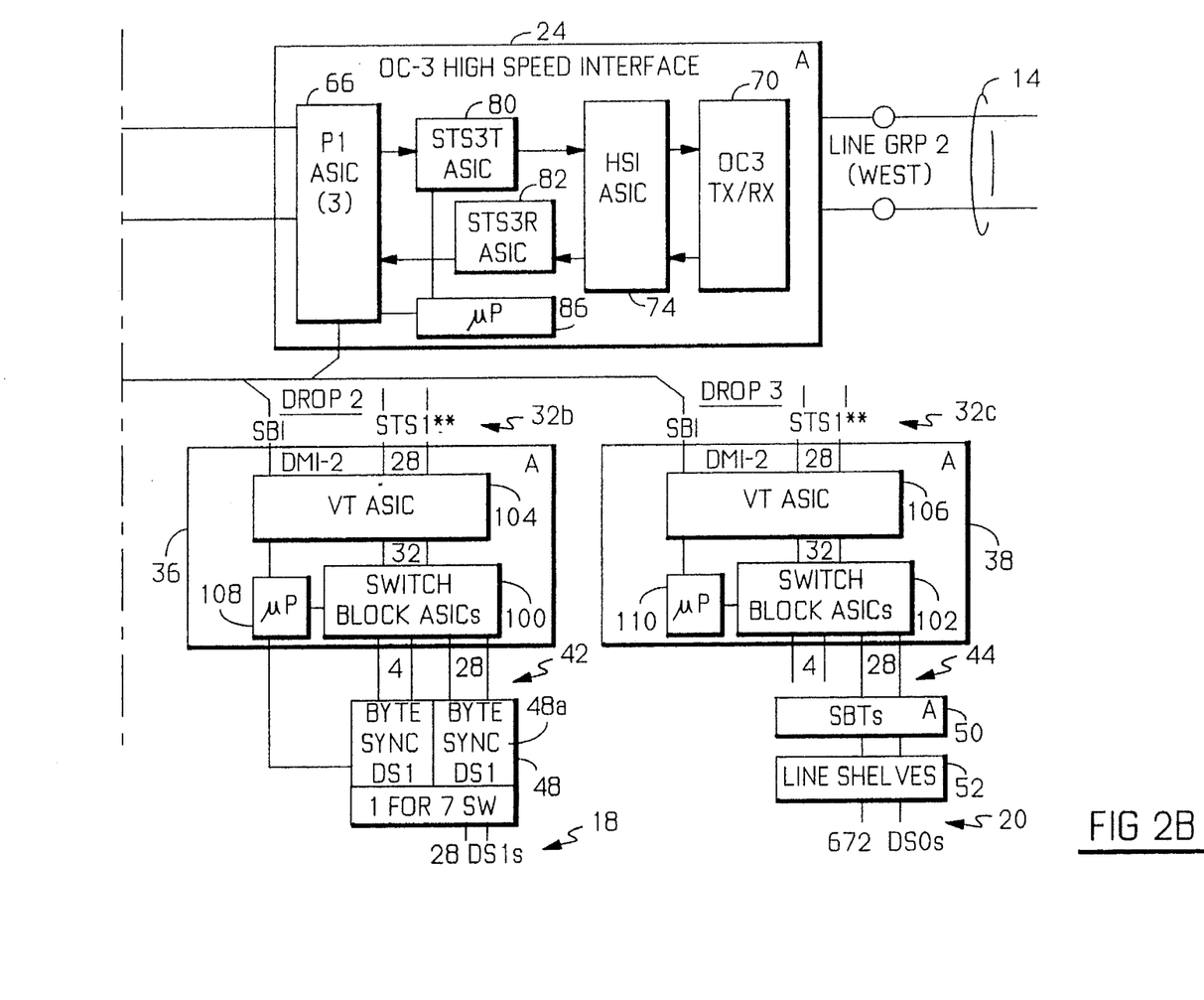

FIG. 2 shows a particular setup for an LCX-150 along the lines suggested by FIG. 1, and showing improvements according to the present invention. The optical fibers 12, 14 are shown in this case as being pairs of unidirectional fibers but could, of course, be single bidirectional fibers. It should be noted that most of the blocks in FIG. 2 are labeled with an "A" in the upper right-hand corner to indicate that only the "A" side of a redundant A/B network element is illustrated. Each of the pairs of fibers 12, 14 is connected to a corresponding OC-3 high-speed interface 22, 24, which has the function of interfacing the optical signals 12, 14 to correspond to electrical signals 26, 28. For the illustrated LCX-150 setup, the optical signals 12, 14 are at the OC-3 level, and these are interfaced by the interfaces 22, 24 to three separate electrical STS-1 signals 26, 28. In other words, three STS-1 signals in a proprietary STS-1 format similar to the basic STS-1 format at the 51.840 Mbit/s line rate are provided between the high-speed interfaces 22, 24 and a cross-connect (VSCC) which has the function, in this particular case, of cross-connecting virtual tributaries (VTs) between the STS-1 buses 26, 28 and similar STS-1 buses 32 on the drop side of the cross-connect 30. These also are in the proprietary STS-1 format similar to the standard STS-1 electrical format, but being proprietary in the sense of having some changes made for internal protection and error detection, which is different from the element-to-element format for equipment and facility protection and error detection between nodes or elements in the network. The STS-1 signals only exist over a very short distance over the backplane. This not being pertinent to the present invention, suffice it to say that the three STS-1** signals 32 may be broken down as shown by three separate signals 32a, 32b, 32c interfaces to three separate lower-level devices 34, 36, 38, respectively, for further demultiplexing/multiplexing to/from lower hierarchical level signals 40, 42, 44. The device 34 is a Drop Module Interface-1 (DMI-1) device, already used in assignee's LCX-150 and is not the subject of the invention. The devices 36, 38, however, represent improvements of the present invention and permit any of the lowest level 672 DS0 channels to be switched among themselves without having to go through the cross-connect 30. The signals on the lines 40, 42, 44 may take the form of serial bus interfaces such as described in U.S. Pat. No. 5,060,229, which is commonly assigned and reference to which is included for background information.

These may be reformatted as twenty-eight asynchronous digital signals at level 1 (DS1) by a block 46, or may be reformatted as twenty-eight byte synchronous DS1s formatted by a block 48, or may be reformatted as 672 DS0s, as provided by serial bus transformers 50 and line shelves 52. The blocks 36, 38 may comprise "DMI-2" cards (Drop Module Interface-2), according to the above-mentioned aspect of the present invention, and the SBT block 50 may comprise four SBT cards per drop, replacing more standard card 46 used with an already in-use DMI-1 card 34. The new cards may be designed to use the same backplane, and the signal interfaces may be chosen to work within the preset limitations of the existing inter-card wiring.

The LCX-150 may also include a network element processor 54 interconnected to the OC-3 high-speed interfaces 22, 24 and the switch blocks 34, 36, 38 via a serial bus interface (SBI) signal line 56. In addition, a clock block 58 and a power supply 60 may be included, along with a craft/orderwire/alarm (COA) panel 62 interconnected to the network element processor 54 for providing craft access, orderwire and alarms. The network element processor may be connected to an operating system via an SML (DS1) or LAN.

Each of the high-speed interfaces 22, 24 includes a number of application-specific integrated circuits (ASICs), including three P1 ASICs, each of which embodies detailed circuitry described in co-owned U.S. patent application Ser. Nos. 07/887,348; 07/886,755; and 07/886,789, which are referred to as background information, since these details do not form any part of the present invention. Each of these P1 ASICs essentially comprises transmit and receive elastic stores with the ability to reconcile slight differences between the rate of the incoming line clock and the local clock 58. Synchronous transport signal (STS) or virtual tributary (VT) pointer interpretation is also included.

OC-3 transmit/receive interfaces 68, 70 form the basic interface between the optical and electrical realms. HSI ASICs 72, 74 provide the function of High Speed Interface data format conversion. A pair of STS-3 receive and transmit ASICs 76, 78 and 80, 82 provide the function of optical-to-STS serial data format conversion. A microprocessor 84, 86 is also included in each high-speed interface 22, 24 for connection to the P1 ASICs and the STS-3 transmit and receive ASICs. This provides the function of provisioning the ASICs, monitoring alarms, switchovers, etc.

The cross-connect block 30 includes a cross-connect block that may take the form of a virtual tributary cross-connect ASIC 88 that constitutes, along with a microprocessor 90, the core switch for transporting and cross-connecting signals on the lines 26, 28 east and west and for adding and dropping signals on the lines 32.

The DMI-1 block 34 has the function of adding/dropping asynchronous DS-1 signals to/from the STS-1 signal 32a. It includes a SONET formatter (SFMT) ASIC 92 such as described in co-owned U.S. patent application Ser. No. 07/886,723, entitled, "Derivation of VT Group Clock from SONET STS-1 Payload Clock and VT Group Bus Definition" which may be referred to for background, such not forming any part of the present invention. Also included in the DMI-1 block 34 is a one-for-seven switch 94 that, together with the SFMT ASIC 92 is controlled by a microprocessor 96. The one-for-seven switch 94** provides the ability to switch in an 8th spare DS-1 line in case of failure of any one of seven.

The one-for-seven switch 94 provides twenty-eight VTs to asynchronous DS1 block 46A and four VTs to asynchronous DS1 block 46b. The VTs provided on lines 40 are provided in the form of SBIs such as disclosed in U.S. Pat. No. 5,060,229, except being at twice the speed with two SBIs interleaved in each line, i.e., operating at 8.196 MHz, each having a payload of 2 SBIs since, for the particular design illustrated, there were not enough wires to carry signals at the standard SBI rate of 4.096 MHz. The function of the asynchronous DS1 blocks 46a, 46b is to convert data from the internal format to DS-1 format.

Referring now to the two DMI-2 blocks 36, 38 of the present invention, these differ from prior art implementations in that switch block ASICs 100, 102 are provided, according to another aspect of the present invention, along with VT ASICs 104, 106, both controlled by microprocessors 108, 110. The function of a DMI-2 block 36, 38 is to fix the pointer format and provide a DS-0 cross-connect. The function of the VT ASICs 104, 106 is to convert data to the drop format, i.e., fixed instead of floating format, while the function of the switch block ASICs is to provide a DS-0 cross-connect for enabling downstream subscribers to be switched together without having to use the cross-connect 30.

The internal structure of the switch block ASICs 100,102 is described below in connection with FIG. 6. Again, 28 VTs are provided from each switch block ASIC on lines 42, 44 at the rate of 8.196 MHz, with 2 SBIs on each wire, so that only 14 wires are used to deliver the 28 VTs to the SBTs 50 and a byte-synchronous DS1 block 48A.

Figure 3:
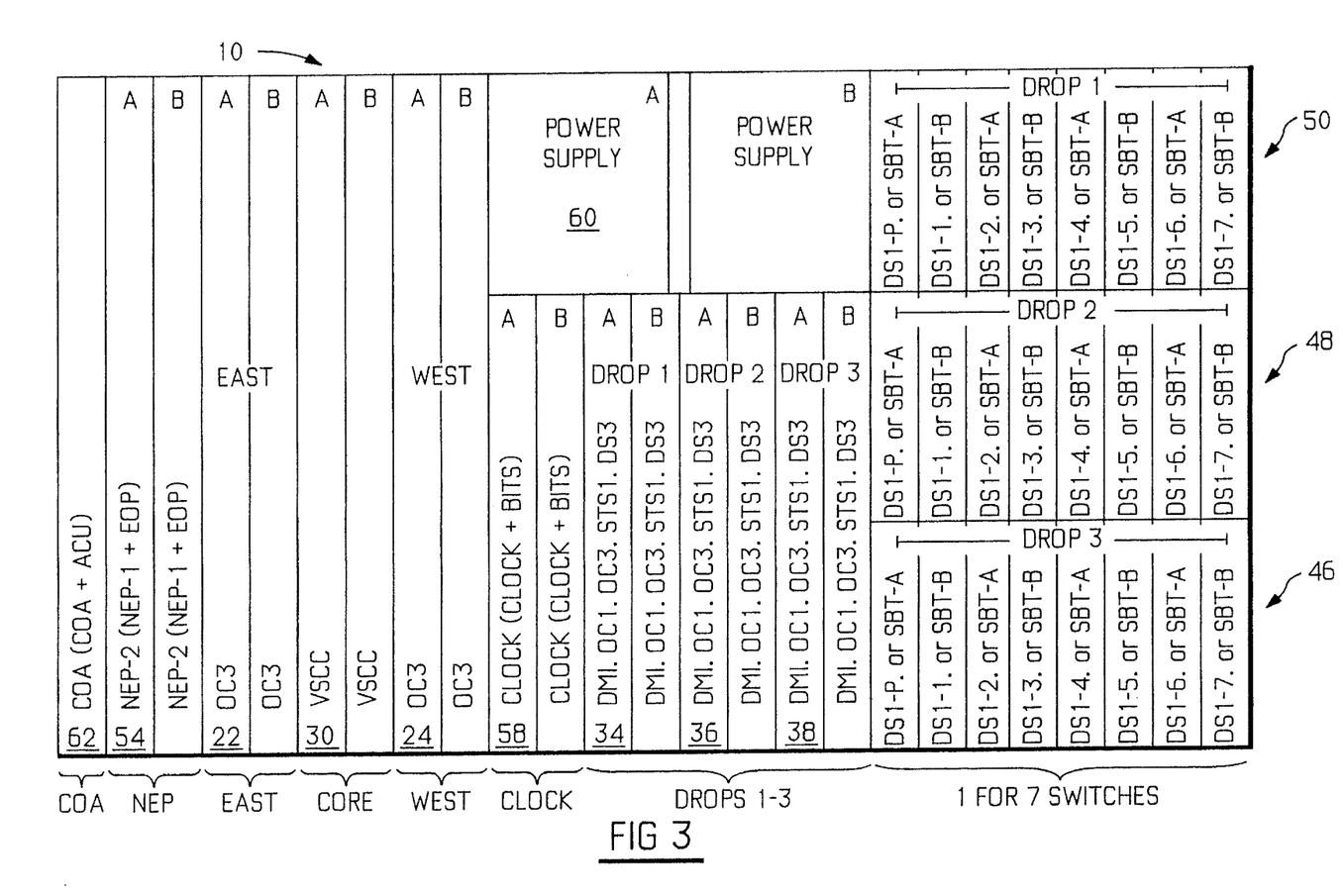
FIG. 3 shows shelf hardware such as may be used in the LCX-150 of FIG. 1 and also showing some aspects of the present invention.

FIG. 3 shows the LCX-150 shelf hardware of FIG. 1 as being made up of a plurality of plug-in cards that are shown edgewise in a side-by-side layout. As will be noted, it includes both the redundant A and B cards for most functions shown in FIG. 2. The three vertical A slots 34, 36, 38 shown in FIG. 3 for the three drops (drop 1, drop 2, drop 3) are shown populated by cards which may be DMI-1 or -2, according to the present invention, OC-1, OC-3, STS-1 or DS3 cards. Further drop cards 46, 48, 50 are shown on the right-hand side of FIG. 3 as smaller size vertical cards stacked in three groups vertically on top of each other, each group having eight cards being either DS1 or SBT cards. For example, for drop 1 and drop 2 of FIG. 2, these would be asynchronous or byte-synchronous DS1 cards, respectively. For drop 3 of FIG. 2, SBTs 50 would be inserted.

Figure 4:
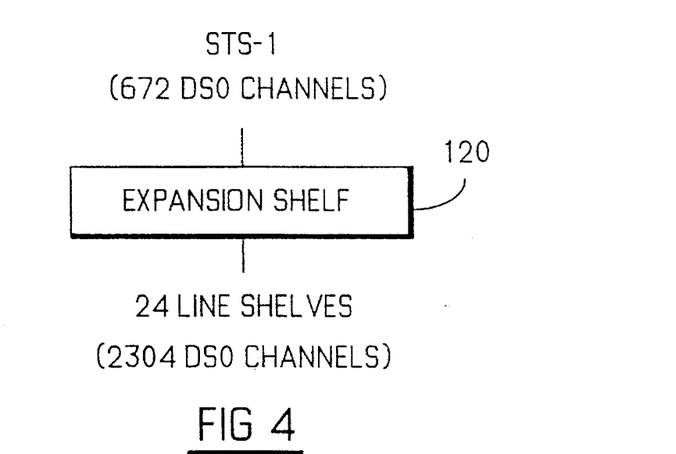
FIG. 4 shows an expansion shelf, according to the present invention.
Figure 5:
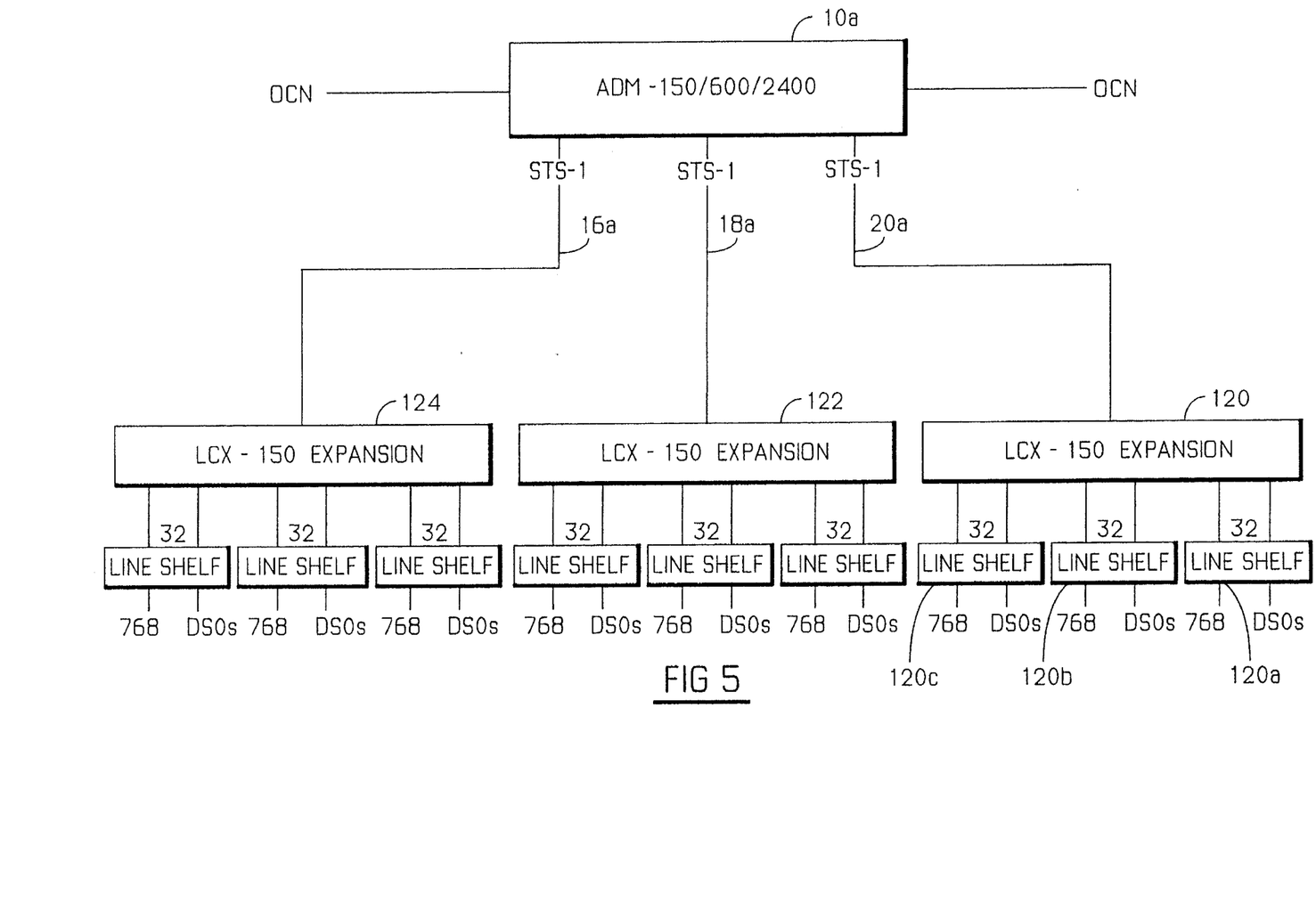
FIG. 5 shows three expansion shelves such as shown in FIG. 4, hooked up to an OC-N add/drop multiplexer, according to the present invention.

An expansion shelf 120, according to the present invention, is shown in FIG. 4 for connection to one of the lines 16, 18, 20 of FIG. 1. These may take the form of STS-1 formatted signals or even OC-1 type signals, i.e., optical signals equivalent to the electrical STS-1 signals. This would be done by simply not using one of the DMI-1 or DMI-2 cards of FIG. 2 and instead converting the related STS-1 signal to an STS-1 or OC-1 signal. Additional expansion shelves 122, 124 can be connected to the other two lines as well, as shown in FIG. 5, for example, by not using any of the DMI-1 or -2 cards 34, 36, 38 of FIG. 2 and instead providing STS-1 signals to such expansion shelves by means of a simple conversion device that converts the STS-1 signal to an STS-1 signal or OC-1 signal. Such a device could be mounted on a card and plugged into the slot intended for the DMI-1 or DMI-2 card. All three shelves are shown hooked up to a core switch 10a (implying three such simple conversion devices in lieu of the DMI-1 or DMI-2 cards of FIG. 2), which may be an LCX-150 core switch 10, such as shown in FIG. 1, or, as additional non-limiting examples, an ADM-150, ADM-600, or ADM-2400 from the Assignee's access product line. Although only three STS-1 drops 16a, 18a, 20a are shown, implying an OC-3 level signal at the high-speed ports, it should be realized that any level OC signal such as OC-1, -3, -9, -12, -18, -24, -36, -48 may be interfaced to a core cross-connect such as the cross-connect 10a shown and utilized with an appropriate number of expansion shelves, according to the present invention. This is symbolized by using the legend OC-N at the high-speed ports. The illustrated case assumes an ADM-150 cross-connect 10a with three expansion shelves 120, 122, 124, and up to six thousand nine hundred and twelve channels (9×768). It will be recalled from the Background of the Invention section above, that the prior art LCX-150 was set up in such a way that seven line shelves would be hooked up to one of the STS-1 drops, and each shelf would have four quadrants with twelve cards in each quadrant, each card having two channels, for a total of six hundred seventy-two DS0 channels per shelf (see FIG. 1). The present invention, on the other hand, permits the use of an expansion shelf 120 having, for example, three groups of line shelves 120a, 120b, 120c connected thereto, each group having eight shelves with four quadrants each with twelve two-channels cards in each quadrant. This adds up to a total of twenty-four, four-quadrant shelves, for a total of twenty-three hundred and four channels. If the other two of the three STS-1 drops are connected to expansion shelves 122, 124 as well, as shown, then the total number of four quadrant shelves will be seventy-two, with a total of six thousand nine hundred and twelve DS0 channels being made available.

The arrangement of FIG. 5 is highly desirable for the reason that additional subscribers may be added without having to add a new LCX-150 switching fabric. Although use of an expansion shelf precludes simultaneous access to all channels, such is not usually necessary, it being extremely unlikely that all subscribers would demand or need service simultaneously.

Figure 6:
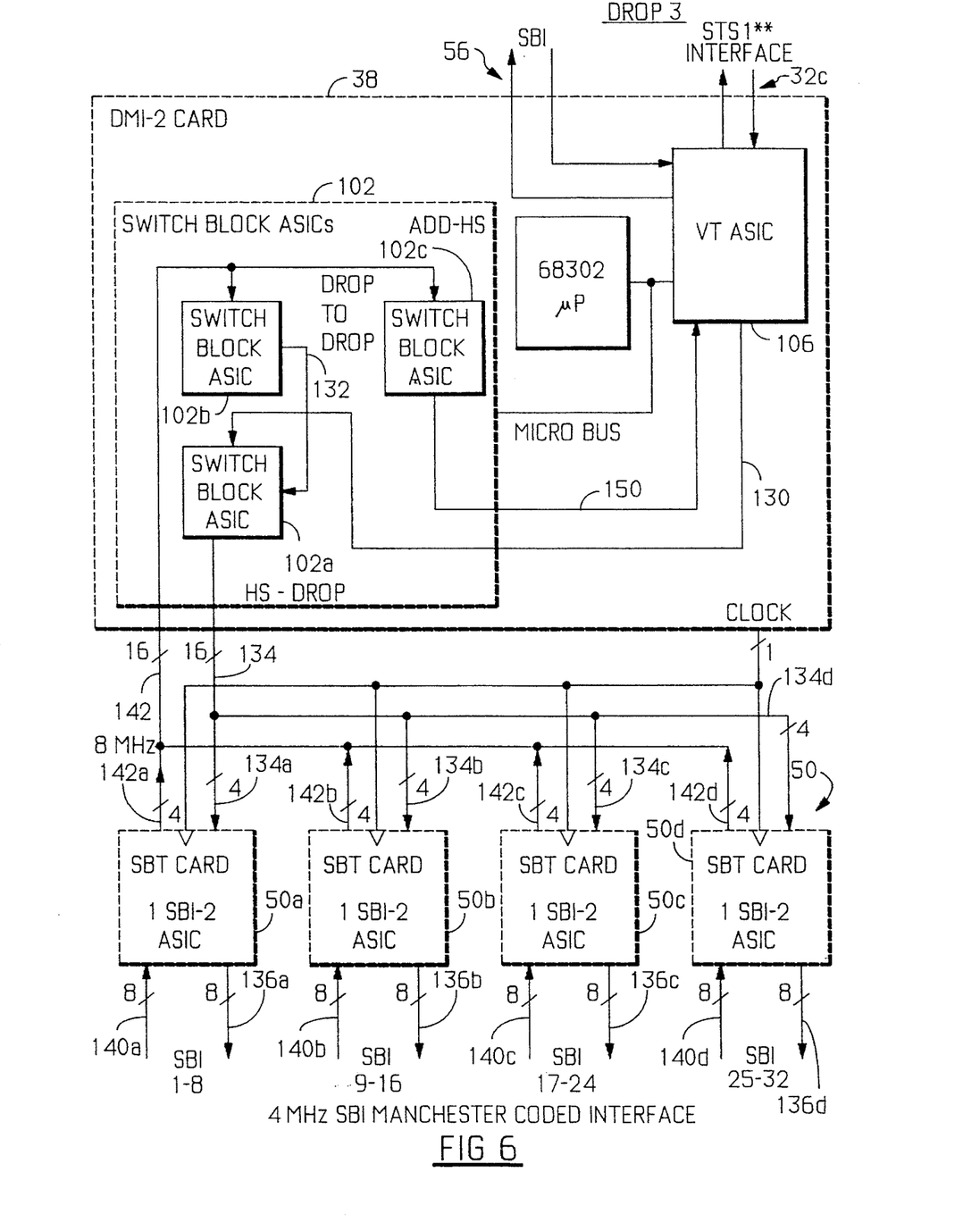
FIG. 6 shows an internal block diagram of one of the Drop Module Interface-2 (DMI-2) cards shown in FIG. 2, along with details of the hookup between the DMI-2 card and a plurality of SBT cards, according to the present invention.

In order to make the expansion shelf possible, it was necessary to design a DMI-2 card which, as may be seen in FIG. 2, has independent usefulness as a DS0 cross-connect without even using an expansion shelf, the details of which are shown in FIG. 6. The reason that a DMI-2 is necessary is because it provides the floating to locked SONET virtual tributary format conversion. This is its primary function when used in a system with an expansion shelf. In other words, the DMI-2 switch blocks are merely used in that application to switch the DS0s straight through the card. When used without the expansion shelf it provides DS0 cross-connect capability by means of the switch blocks.

FIG. 6 shows an overview of the signal-carrying circuits in the DMI-2 card 38 and SBT cards 50 of FIG. 2. Note that the signals 134, 142 that go between the DMI-2 card 38 and the SBTs 50a, 50b, 50c, 50d run at 8.196 MHz, each carrying a payload of two SBIs which normally run at 4.096 MHz (as shown in U.S. Pat. No. 5,060,229). The reason for this is that there were not enough wires for the particular design illustrated to carry signals at the standard SBI rate of 4.096 MHz. This is not pertinent to the present invention, however. The switch block ASICs 102 of FIG. 2 are illustrated in FIG. 6 as being three switch blocks 102a, 102b, 102c. A high-speed drop switch block ASIC 102a is responsive to a drop signal on a line 130 from the VT ASIC 106. It is also responsive to a daisy-chain input signal on a line 132 from a drop-to-drop switch block ASIC 102b, which permits channels from downstream line shelves to be switched among each other, as described more fully below in connection with FIGS. 7 and 8.

The high-speed-drop switch block ASIC 102a provides an output signal on a line 134 to an SBT card 50a which, in turn, provides a 4.096 MHz version thereof on a line 136a to a line shelf 52 (as shown in FIG. 2). It should be noted that the 16 different serial signals on the line 134 are split into four separate, four signal lines 134a, 134b, 134c, 134d, and provided to SBT cards 50a, 50b, 50c, 50d, respectively. Thus, SBT card 50b provides eight output signals on lines 136b, SBT card 50c provides eight output signals on lines 136c, and SBT card 50d provides eight output signals on lines 136d.

Thus, the DMI-2 card 38 of FIG. 6 utilizes a plurality of switch block ASICs to complete a switch matrix in which a plurality of DS1s (28) may be received from the STS-1** and passed via a VT ASIC 106, which may be a VT floating-to-locked converter to the switch block arrangement 102, which performs DS0 channel grooming in the high-speed-to-drop direction. The output is in the form of multiple serial datastreams. In the add direction, data arrives in a serial data format and is groomed before being passed to the high-speed side via the VT ASIC 106. The switch block ASIC arrangement 102 provides full drop-to-drop grooming capability.

Figure 7:
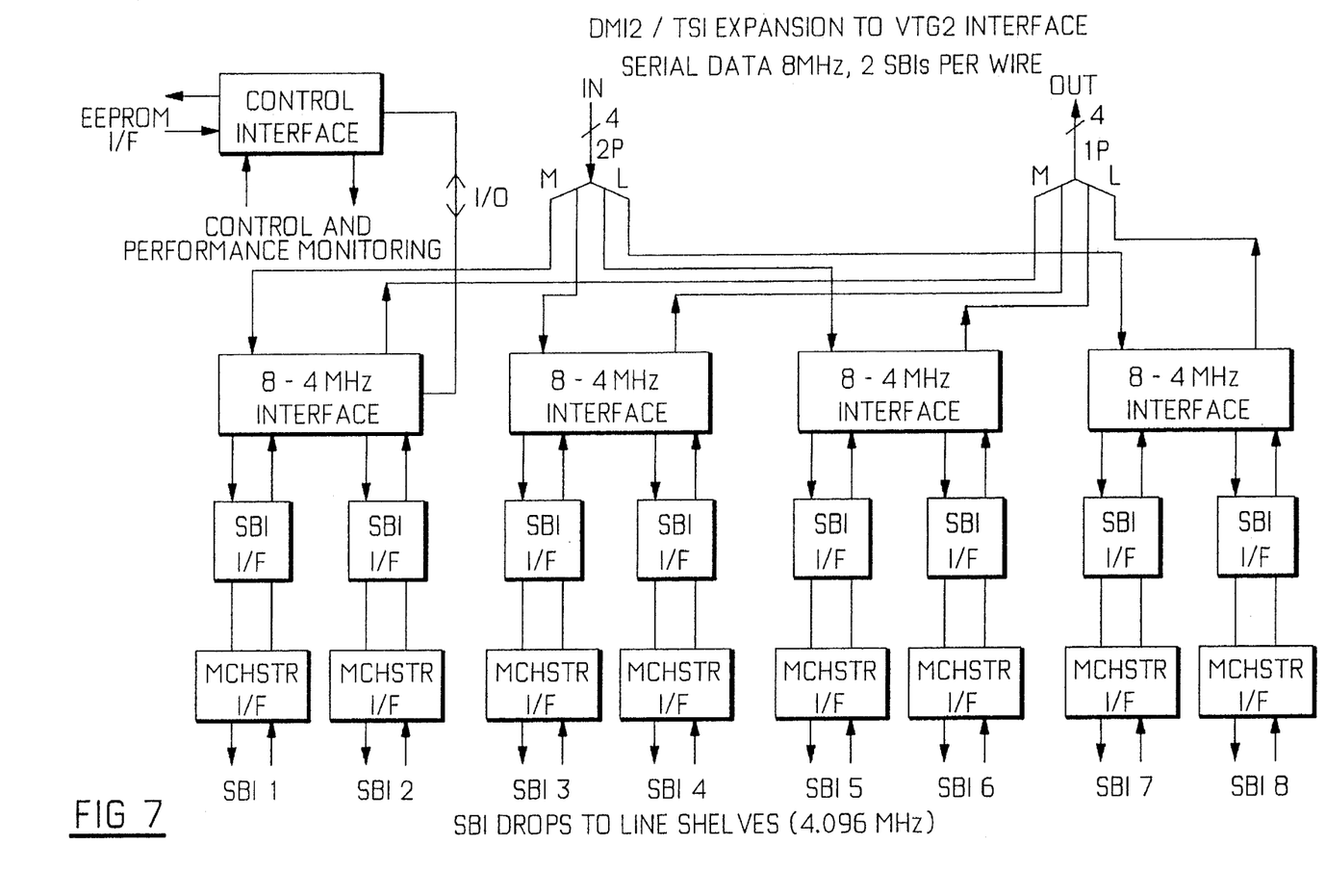
FIG. 7 shows details of the internal functions of the SBI-2 ASIC resident on each of the SBT cards of FIG. 6.

FIG. 7 shows details of the internal functions of an SBI-2 ASIC resident on each of the SBT cards 50a, 50b, 50c, 50d of FIG. 6. The SBI-2 ASIC converts between serial 8 MHz format, for instance on the line 134a, (from the switch block ASIC 102a of FIG. 6 on the DMI-2 card) and the normal SBI 4 MHz Manchester coded format on the line 136a. Return SBIs at the 4 MHz rate (in the add direction) on lines 140a, 140b, 140c, 140d of FIG. 6 are not frame-aligned with one another, so the SBTs are designed to byte-align them and then transmit an offset count to the switch block ASIC 102c, which can then place channel data in the correct locations in memory according to an offset-plus-timeslot number calculation. The SBI-2 ASIC may also be provided with SBT performance monitoring capabilities using parity bits available in each channel. Access to such performance data and also an on-card inventory EPROM may be provided via a channel in the 8 MHz link to the DMI-2 card, as described further below.

As also shown in FIG. 6, an additional switch block ASIC 102b is provided that is responsive to the add direction signal on the line 142 for the purpose of providing an output signal on the line 132 to the daisy-chain input of the switch block ASIC 102a for drop-to-drop communications between subscribers hooked up downstream of a same DMI-2 card. In the prior art of FIG. 1, this would have been done by routing the signal all the way back to the nearest central office, switching it back to the LCX-150, and thence to the drop-thus wasting valuable capacity on the OC-3 highway for a local connection. The switch block ASIC of the present invention may thus be used as shown in FIGS. 2 and 6 in the manner shown to route such local calls between subscribers downstream of the DMI-2 card. For calls that must use the cross-connect, the switch block ASIC 102c of FIG. 6, in the add direction, provides an output signal on a line 150 to the VT ASIC 106, which in turn provides an output signal in the add direction on the line 32c to the cross-connect 30 of FIG. 2.

Figure 8:
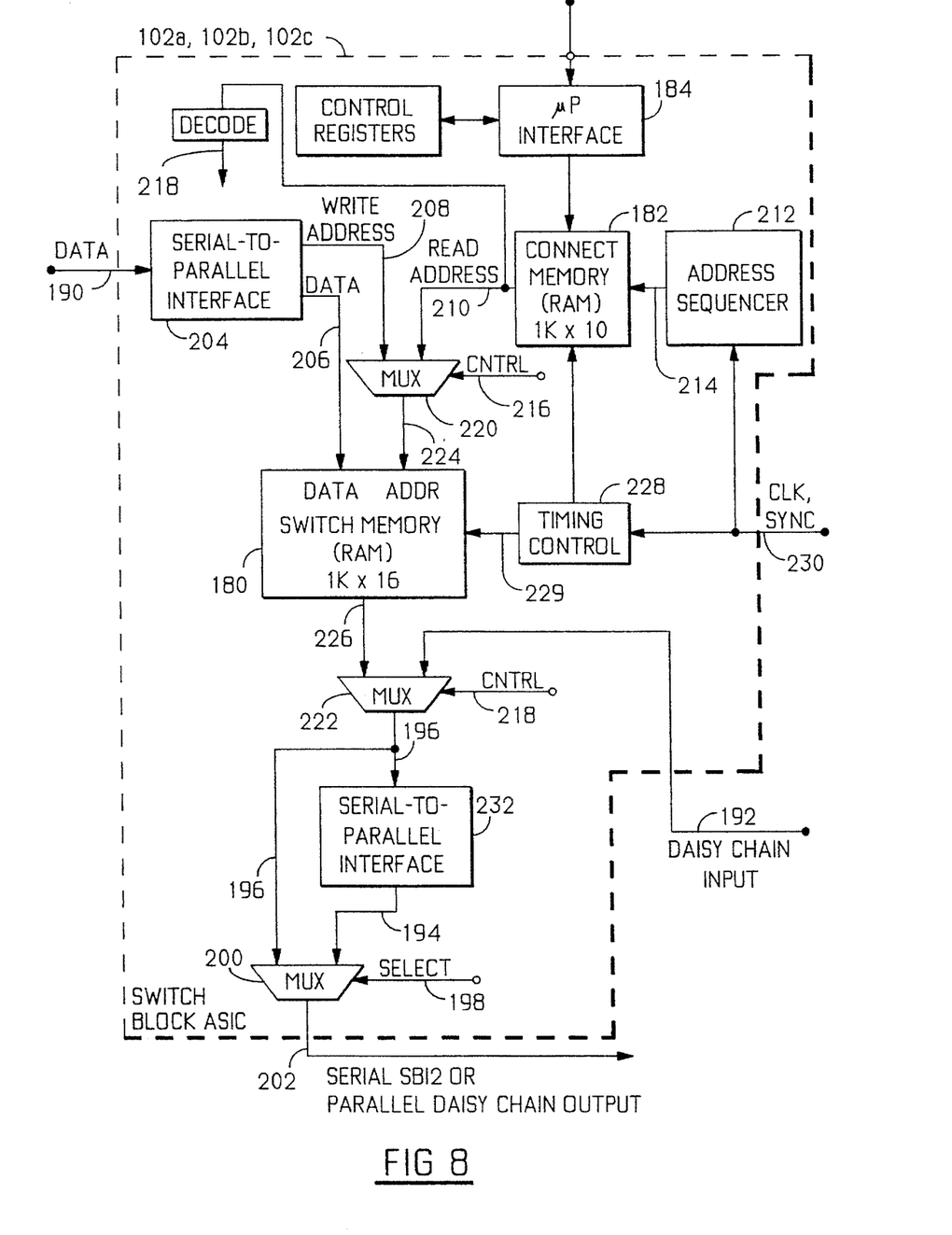
FIG. 8 shows a block diagram of a switch block ASIC, according to the present invention.

A block diagram of a switch block ASIC is shown in FIG. 8. It uses a 1K×16-bit RAM 180 for the main timeslot interchanger (TSI) data switch memory, together with a 1K×10-bit connect memory 182. The connect memory 182 and all control registers are available memory mapped via a parallel access microprocessor interface 184. The switch block ASIC has two data input buses, one being a DATA input bus shown as a line 190 and one being another data input bus shown as a line 192, called the "daisy-chain input". It has a serial output bus shown as a line 194 and a parallel output bus shown as a line 196, one of which is selected by a select signal on a line 198 by a multiplexer 200 which then provides either a set of serial SBI output signals at the 8.196 MHz rate or a parallel daisy-chain output on a bus shown as a line 202 at the same rate.

A serial-to-parallel interface 204 is responsive to the serial data input on the line 190 and provides a parallel data signal on a line 206 and a parallel write address signal on a line 208. A parallel read address signal on a line 210 is provided by the connect memory 182 in response to an address sequencer 212 which provides a count signal on a line 214 to the connect memory. It counts, sequentially addressing each memory location in the connect memory in turn, and then repeats, ad infinitum. The microprocessor interface 184 receives read addresses from an external source, not the subject of the invention, and provides the proper read addresses in the locations sequenced by the sequencer 212 and provides multiplexer control signals on lines 216 to the multiplexer 220 and the select signal on the line 198 for the multiplexer 200. The multiplexer 220 is controlled to provide the write address on the line 208 onto a switch memory address line 224 at the appropriate time for entering incoming data on the line 206 into the switch memory 180. Similarly, the multiplexer 220 is controlled by the control signal 216 from the microprocessor interface 184 to provide the read address signal on the line 210 on the address line 224 for the purpose of reading data out of the switch memory onto an output line 226 provided to the multiplexer 222. The multiplexer 222 may be controlled by a decode block that decodes particular read addresses on the line 210 for controlling the control signal 218 to select the daisy-chain input. A timing control 228 provides timing signals on a line 229 in response to clock and frame sync signals on a line 230 to insure proper timing coordination between the address sequencer, the connect memory and the switch memory.

The multiplexer 222 is controlled by the control signal on the line 218 to provide the parallel data signal on the line 196 from either the switch memory output line 226 or the daisy-chain input 192. A parallel-to-serial interface 232 is used to convert the parallel signal on the line 196 to a serial signal on the line 194. The switch block ASIC shown in FIG. 8 is a key component which makes possible the expansion shelf of the present invention because it provides flexible serial or parallel connectivity and can be used as a general purpose building block in many different combinations. It is used in both the DMI-2 card, as shown in FIG. 2, but also in the expansion shelf to be explained below.

Figure 9:
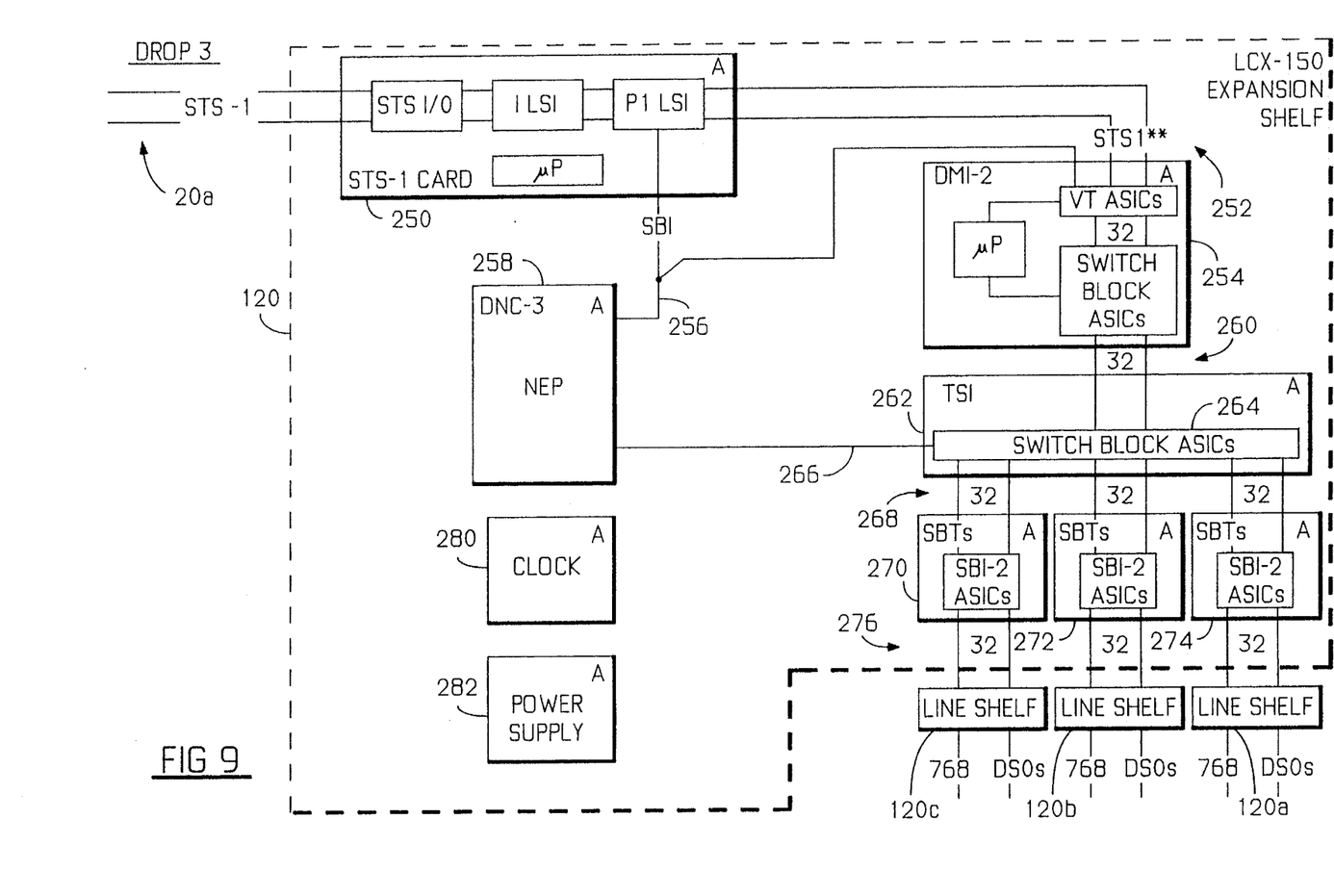
FIG. 9 shows a block diagram of an expansion shelf such as shown in FIG. 4, according to the present invention.

FIG. 9 shows a block diagram of an expansion shelf 120, such as shown in FIGS. 4 and 5. It uses an STS-1 card 250 similar to one of the high-speed interface cards 22, 24 shown in FIG. 2, in that it performs line overhead such as error detection, counting, automatic switchover, etc.

An STS-1** signal on a line 252 is provided to a DMI-2 card 254, and a bidirectional SBI signal on a line 256 (two separate wires, one for each direction) is provided to a network element processor 258. The DMI-2 card 254 is the same as the DMI-2 card 38 already described in connection with FIG. 2 and FIG. 6. All thirty-two VTs are provided on a line 260 to a timeslot interchanger (TSI) 262 having a plurality of switch block ASICs 264 interconnected in a way to be described in more detail below in connection with FIG. 10. The switch block ASICs 264 are controlled by the NEP 258 by means of a bidirectional control bus shown as a line 266. The switch block ASICs 264 provide, for example, three groups of thirty-two VTs each on lines 268 to corresponding SBTs 270, 272, 274. The signals on the lines 268 are at the 8.196 MHz rate, while output signals on three pairs of output lines 276 are at a 4.096 MHz rate, as described above in connection with FIG. 7. These are, in turn, hooked up to three corresponding groups of line shelves 120c, 120b, 120a, as shown also in FIG. 5.

Figure 10:
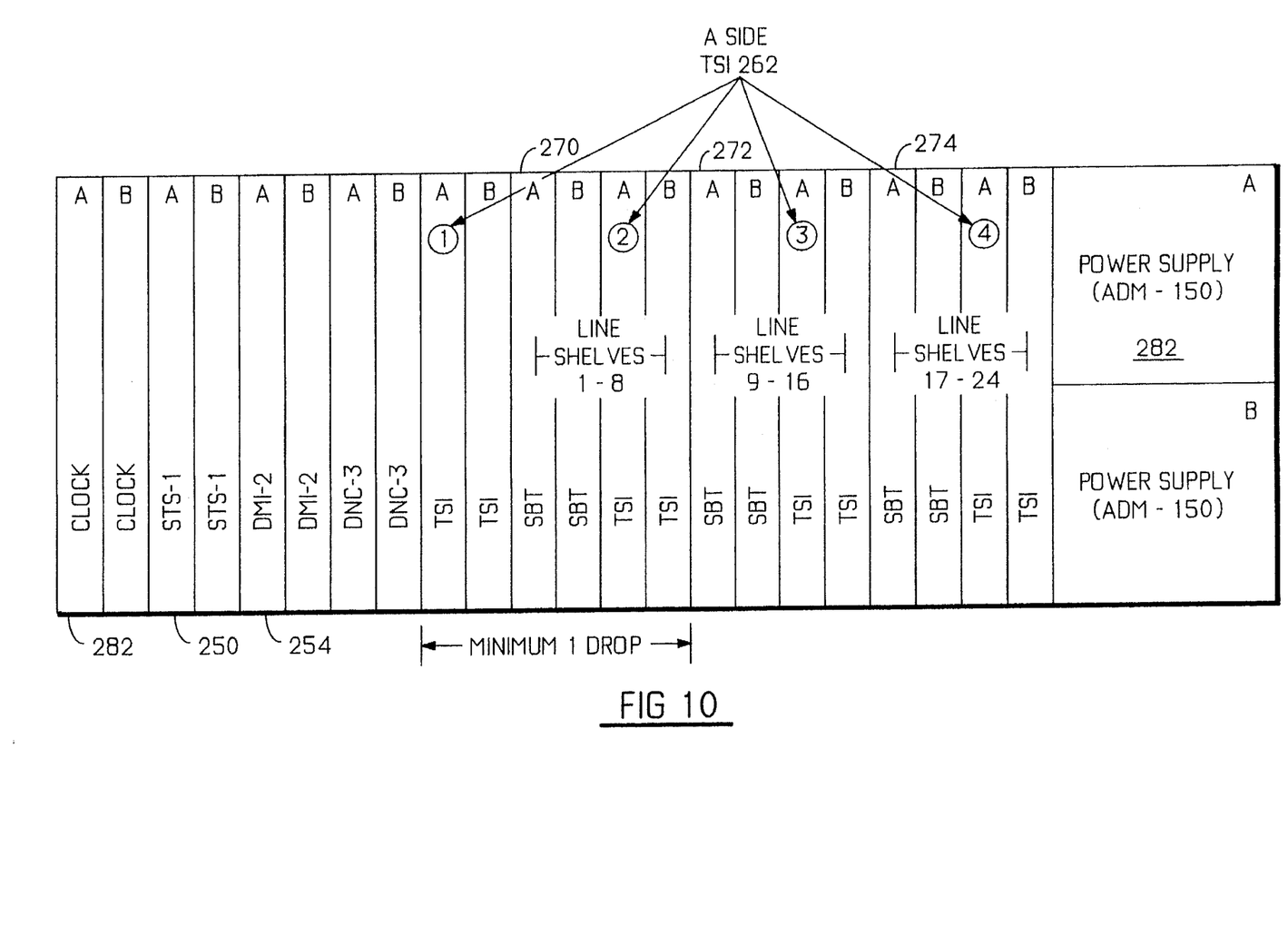
FIG. 10 shows exemplary expansion shelf hardware, according to the present invention, having both A and B redundant plug-in circuit cards.

The expansion shelf 120 also includes a clock unit 280 and a power supply 282. FIG. 10 shows exemplary expansion shelf hardware comprising a plurality of plug-in circuit boards shown edgewise plugged into a cabinet rack. Both A and B redundant cards are shown, although only the A side cards are shown in FIG. 9.

Figure 11:
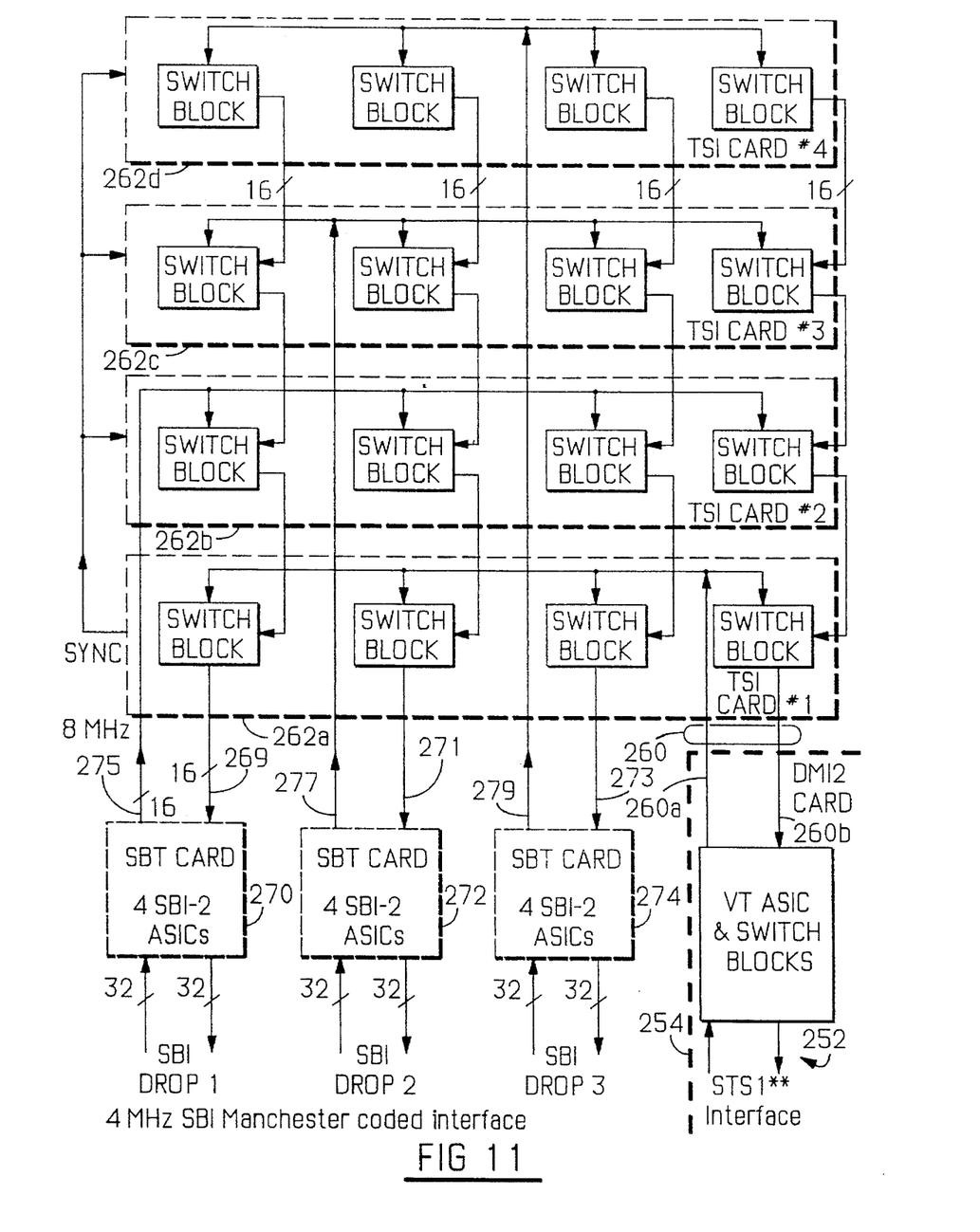
FIG. 11 illustrates, according to the present invention, the timeslot interchanger of FIG. 9 in more detail, and also shows the timeslot interchanger hooked up to the SBT cards on one side and the DMI-2 card on the other side, as also shown in FIG. 9.

FIG. 11 shows the three SBTs 270, 272, 274 of FIG. 9 and the timeslot interchanger 262 as comprising four TSI cards 262a, 262b, 262c, 262d. Each of the TSI cards is shown as having four separate switch block ASICs of the type shown in FIG. 8. STS-1** formatted signals on the line 252 are converted to 8 MHz serial format on the line 260, and vice-versa, by the VT ASIC on the DMI-2 card 254 in the lower right of the figure. As mentioned, the TSI 262 may be made from four identical cards 262a, 262b, 262c, 262d, each of which provides/receives serial data to/from, respectively, drop 1, drop 2, drop 3 and the high-speed interface. Each card contains four switch block ASICs. The row-wise inputs store identical copies of the input stream presented thereto. For example, each of the switch blocks on card 262a is responsive to an input signal 260a from the DMI-2 card 254. Similarly, each of the switch blocks on cards 262b, 262c, 262d are row-wise responsive to input signals on lines 275, 277, 279, respectively. The outputs are connected column-wise, so that any input group can "talk", i.e., be switched, to any output group. The chips are connected together column-wise using a daisy-chain scheme to avoid the inherent problems of tristate buses, latchup, reliability problems and the difficulty of fault location. Several of the switch blocks on the card #1 (262a) have outputs on lines 269, 271, 273 connected to the SBT cards 270, 272, 274, respectively, while one of the switch blocks has its output on a line 260b connected to the DMI-2 card 254.

The design shown in FIG. 11 requires a minimum of TSI cards #1 (262a) and #2 (262b) to be in place for one drop (Drop 1). Drops 2 and 3 can be enabled by plugging in cards #3 (262c) and #4 (262d), respectively. Due to the daisy-chain design, adding the new cards will not interfere with traffic in progress on the existing cards.

The design is totally non-blocking, i.e., any channel and any input can be connected to any channel and any output group, regardless of any other connections that may have been set up.

Figure 12:
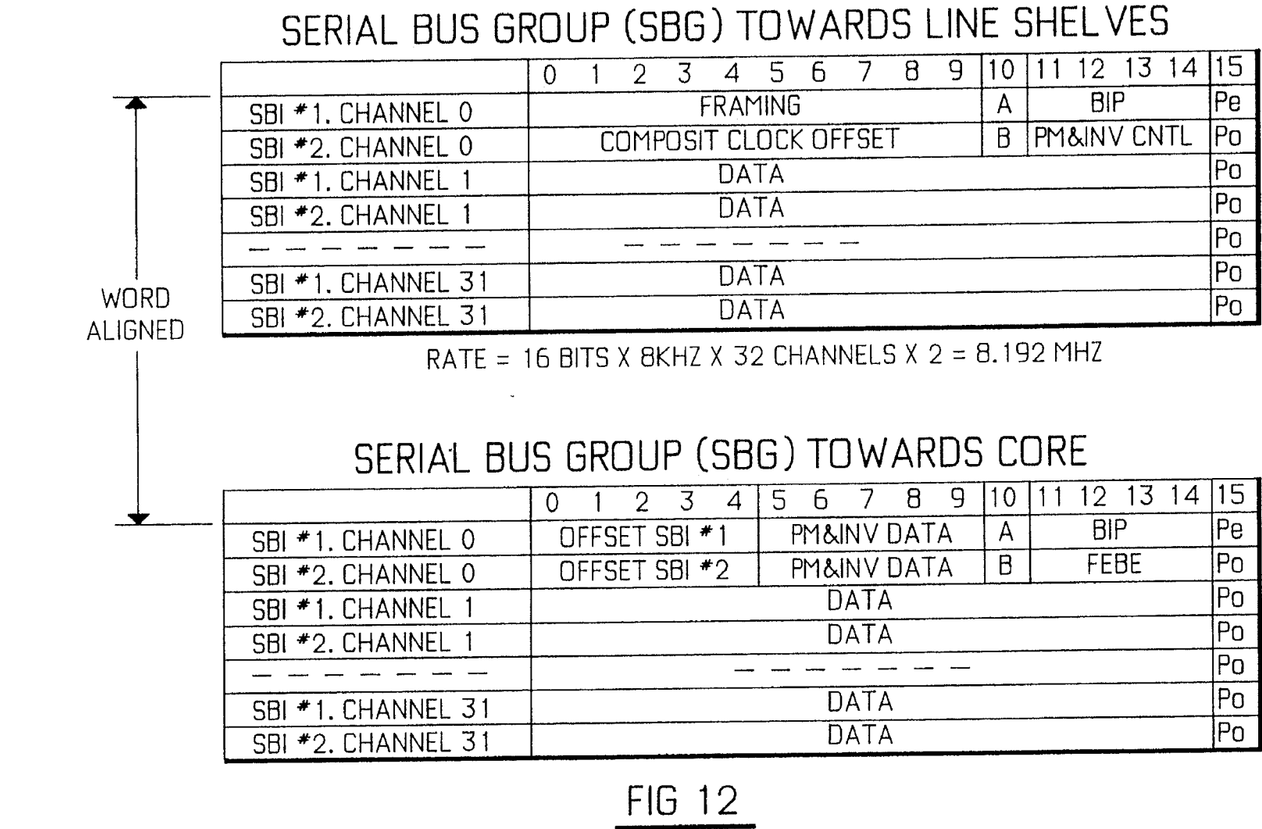
FIG. 12 illustrates, according to the present invention, the serial bus format used to transport two SBI's worth of data between the switch-block ASICs of the timeslot interchanger of the DMI-2 card and the SBT cards with data from the two SBIs byte interleaved.

FIG. 12 illustrates the serial bus format used to transport two SBI's worth of data between the switch block ASICs of the timeslot interchanger of FIG. 9 and the SBTs with data from the two SBIs shown byte-interleaved. Data toward the line shelves includes two interleaved SBIs, except for timeslot 0, which contains special data, including a sync pattern, composite clock offset, AB line shelf SBI select, performance monitoring BIP and SBI chip control data. Return data from the line shelves are frame asynchronous, so one function of the SBI-to-ASIC is to compute an offset which can be sent to the switch block ASIC telling it how to compute the true channel number of each timeslot and where to store the data. This minimizes through delay and avoids the need to store a whole frame of data in the SBI-2.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An improved network element having a cross-connect connected to a plurality of line shelves each line shelf for connection to a first number of subscribers, wherein the improvement comprises at least one expansion shelf substituted for a corresponding at least one of the plurality of line shelves connected to the cross-connect and connected to additional line shelves, each additional shelf for connection to a number of subscribers equal to said first number, wherein said expansion shelf is for connecting a number of subscribers greater at least by a factor of two than said first number of subscribers to said cross-connect.

2. The improved network element of claim 1, wherein said at least one expansion shelf comprises a timeslot interchanger, comprising:

at least a first group of switch blocks, each responsive to a drop signal and each responsive to a corresponding input daisy-chain signal from an output of a corresponding switch block in an at least second group of switch blocks, each switch block of said first group for providing said corresponding input daisy-chain signal or said drop signal as an output signal; wherein each corresponding switch block of said at least second group of switch blocks is at least responsive to an input signal for providing said corresponding input daisy-chain signal from said output of said corresponding switch block.

3. The improved network element of claim 2, wherein said timeslot interchanger further comprises one or more additional groups of switch blocks, each additional group responsive to at least a corresponding additional input signal for providing, from an output of each switch block in said each additional group, a corresponding output signal to a daisy-chain input of a corresponding switch block in another group of switch blocks.

* * * * *

UNITED STATES PATENT AND TRADEMARK OFFICE
CERTIFICATE OF CORRECTION

PATENT NO.   : 5,497,363
DATED        : March 5, 1996
INVENTOR(S)  : M. Gingell

It is certified that error appears in the above-indentified patent and that said Letters Patent is hereby corrected as shown below:

At column 10, line 55 (line 13 of claim 2), please insert a comma after "signal".

Signed and Sealed this

Thirteenth Day of August, 1996

Attest:

BRUCE LEHMAN

Attesting Officer

Commissioner of Patents and Trademarks